United States Patent [19]
Wilson

[11] Patent Number: 5,340,003
[45] Date of Patent: Aug. 23, 1994

[54] BICYCLE CARRIER RACK ADAPTER

[76] Inventor: Mark S. Wilson, 1731 Foster Ct., Santa Cruz, Calif. 95062

[21] Appl. No.: 58,970

[22] Filed: May 5, 1993

[51] Int. Cl.⁵ .................................................. B62J 7/04
[52] U.S. Cl. .................................... 224/39; 224/32 A; 224/917; 224/42.42; 224/30 R
[58] Field of Search ............... 224/39, 30 R, 31, 32 A, 224/32 R, 42.01, 42.42, 42.45 R, 917

[56] References Cited

U.S. PATENT DOCUMENTS

| | | | |
|---|---|---|---|
| 3,623,747 | 11/1971 | Humlong | 224/32 A |
| 3,746,392 | 7/1973 | German | 297/380 |
| 3,827,613 | 8/1974 | Meyer | 224/32 A X |
| 4,030,648 | 6/1977 | Johnson et al. | 224/31 |
| 4,053,091 | 10/1977 | Martelet | 224/32 A |
| 4,258,870 | 3/1981 | Edelson | 224/32 A |
| 4,964,551 | 10/1990 | O'Donovan et al. | 224/32 A |
| 5,040,710 | 8/1991 | Lee | 224/39 |
| 5,207,361 | 5/1993 | Slifka | 224/39 |

FOREIGN PATENT DOCUMENTS

| | | | |
|---|---|---|---|
| 535514 | 2/1955 | Belgium | 224/32 A |
| 2265601 | 11/1975 | France | 224/39 |
| 741010 | 11/1955 | United Kingdom | 224/39 |
| 2066751 | 7/1981 | United Kingdom | 224/32 A |

*Primary Examiner*—Ernest G. Cusick
*Attorney, Agent, or Firm*—Jeffrey A. Hall

[57] ABSTRACT

A bicycle carrier rack adapter comprising a bracket member having a first arm, a second arm and a connecting element joining the first and second arms. At least one aperture is provided in each arm and the connecting element. A fastening member is detachably secured to the connecting element by fasteners. A pair of adjustable clamp members including a first and a second aperture are configured to receive and secure a fastening element allowing attachment of either the first and second arm of the bracket member. A coupling member for securing a bicycle carrier rack to the bracket member is also provided. The coupling member includes a pair of legs and a joining member and is adapted to be received and secured within the apertures of the adjustable clamp members, allowing for easy and convenient attachement of a wide variety of bicycle accessories such as child carriers, cargo carriers, surfboard racks, golf club bag carriers, and the like to a standard bicycle rack.

20 Claims, 9 Drawing Sheets

BICYCLE CARRIER RACK ADAPTER

BACKGROUND OF THE INVENTION

1. Field of Invention

This invention relates to bicycle carrier racks, and more particularly to multi-use bicycle carrier rack adapters for use with child carriers, cargo carriers, golf bag carriers, surfboard carriers, and the like.

2. Description of the Related Art

Prior carrier racks for bicycles have, for the most part, been attached directly to the bicycle frame. The rear seat stays, rear dropout, chain stays, and/or seat robe have been utilized for the rear carrier attachment. The front fork of the bicycle, fork tip, head tube and/or handle bars have also been used for front carrier accessories. Carder accessories attached to a bicycle frame are difficult to assemble and install. Accessories such as a small child carder seat, cargo carrier, surfboard carrier, or golf club carder often stay on the bicycle because of the difficulty and inconvenience involved in removing and reattaching such accessory. However, leaving the accessory on the bicycle tends to discourage the bicyclist from using the bicycle for any use other than the accessory's function. For example, as long as a small child seat carrier is attached, the bicycle mainly gets used for taking a child for a bike ride.

Representative of this genre of prior bicycle carrier accessories include U.S. Pat. Nos. 2,320,344 issued to Belanger, 2,234,299 issued to Christy, 3,746,392 issued to Svensson et at., and 4,367,829 issued to Kusz. Similarly, related prior golf club carders for bicycles of this type include U.S. Pat. Nos. 4,770,326, issued to Thompson and 4,817,833 issued to Rebera. Surfboard carriers for bicycles of this type include U.S. Pat. No. 4,296,878 issued to Ward et al. Cargo carriers for bicycles of this type include U.S. Pat. No. 4,367,829 issued to Kusz. When any of such type of carriers are left attached to the bicycle because of the inconvenience of attachment and removal of the carrier, the likelihood of using the bicycle narrows considerably. Only after the carrier accessory is removed will one be more apt to use the bicycle, especially for recreational purposes. Therefore, the prior accessory carriers which are attached to a bicycle frame, while broadening a specific utility of the bicycle, discourage overall use of the bicycle because of the inconvenience and bother of removal of the accessory, and greatly diminish recreational use of the bicycle.

Most contemporary mountain, racing, street, cruising and hybrid bicycles have bosses, gussets and/or brazed on eyelid mountings on the seat stays and rear dropout as well as on the front fork and lower fork tips allowing for securing horizontally oriented support racks thereon. Representative examples include, Blackburn Designs of Campbell, Calif., and Rhode Gear of Providence, R.I. which have produced standard racks for many years. Recently, many major bicycle manufacturers such as Trek of Waterloo, Wis., Specialized Components of Morgan Hill, Calif., and Diamond Back (Avenir) of Camarillo, Calif. have begun to market similar racks. Such racks provide for more convenient attachment and removal of panniers and small carriers. Prior U.S. Patents disclosing such panniers and carriers include, U.S. Pat. Nos. 4,516,705 issued to Jackson, 4,671,438 issued to La Plante, and 4,387,835 issued to Golzer. In addition to these disclosures, rack design has been modified to easily accommodate the attachment and removal of child seats and cargo carriers as disclosed in U.S. Pat. Nos. 4,030,648 issued to Johnson et al. and 4,053,091 issued to Schimmels. Such related art consists of accessories that are either connected directly to the bicycle frame or accessories that are connected to a specially designed rack. Nowhere in the prior art is there mention or teaching of an adapter that attaches to a standard rack allowing for the quick attachment and removal of a variety of accessories.

Another type of carrier and mounting assembly for bicycles is disclosed in U.S. Pat. No. 3,902,737 issued to Berger et al. which discloses a U-shaped auxiliary frame member with a pair of spaced downwardly turned leg portions and a pair of clamps on a support member which is adapted to be clamped on the forward portion of a bicycle. Such device being attached to the head post was dangerous, inconvenient, and cumbersome. Such limitations have undoubtedly been a reason such carriers have not received widespread acceptance.

Another type of carder device for tandem or double seat motorcycles is disclosed in U.S. Pat. No. 4,466,660 issued to Mabie, which utilized parallel depending legs having a stop to limit the downward sliding movement of the legs into any of a number of pairs of opposed sockets which were attached to horizontal elongated bars along the rack.

Still another type of motorcycle rack is disclosed in U.S. Pat. No. 3,791,563 issued to Raat, which disclosed an interchangeable rack-carrier system wherein the rack supports terminate in two open tubes which receive and exchange an adopted element having a pair of spaced end portions which mate with open tubes on the rack support. Such rack is adaptable for motorcycles but is not useful or adaptable on bicycles.

Accordingly, it is the primary object of this invention to provide a bicycle carrier rack adapter which can easily, quickly, and conveniently attach to, release from, and interchange with, various bicycle carrier accessories such as child carriers, cargo carriers, golf bag carriers, surfboard carriers and the like on bicycles and motor driven cycles, and be easily and conveniently attached and removed from the bicycle.

It is a further object of the present invention to provide such a bicycle carrier rack adapter which is easily, quickly, and conveniently secured to standard bicycle racks without modification resulting in a vastly improved bicycle carrier means which utilizes the rack and not the bicycle frame for accessory attachment.

Additional objects and advantages of the invention will be set forth in the description which follows, and in part win be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and advantages, and in accordance with the purposes of the invention as embodied and broadly described herein, a multi-use bicycle carrier rack adapter, comprising: a bracket member having a first arm, a second arm, and a connecting element joining said first arm and said second arm; the first arm includes at least one aperture therein, the second arm includes at least one aperture therein, and the connecting element includes at least one aperture therein; a fastening member detachably secured to said connecting element by fastening means; a pair of adjustable clamp member, each of said pair of adjustable clamp members having a first aperture and a second aperture, said first aperture of each of said pair of adjustable clamp members is adapted to receive and secure a fastening element means allowing attachment to either the first arm or the second arm of the bracket member, and, a coupling member for securing a bicycle carrier rack to said bracket member, said coupling member including a pair of legs and a joining member, each of said pair of legs are respectively adapted to be adjustably received and secured within said second aperture of one member of the pair of adjustable clamp members.

In accordance with the present invention there is also provided a bicycle carrier rack adapter, comprising: a substantially C-shaped bracket member having a first arm, a second arm, and a connecting element joining said first arm and said second arm; the first arm includes an aperture operably positioned therein, the second arm includes an aperture operably positioned therein, and the connecting element includes at least one aperture therein; a fastening member operably coupled to said connecting element by a fastening means; a pair of adjustable clamp members, each of said pair of adjustable clamp members having a first aperture, a second aperture and a slit extending into said clamp member, said first aperture of each of said pair of adjustable clamp members is adapted to receive and secure a fastening element means allowing attachment of said clamp member to said C-shaped bracket member, and, coupling means for securing a bicycle carrier rack to said bracket member, said coupling member includes a pair of legs secured to a joining member, each of said pair of legs are each respectively adapted to be adjustably received and secured by one member of the pair of adjustable clamp members.

BRIEF DESCRIPTION OF THE DRAWINGS

The accompanying drawings, which are incorporated in and constitute a part of the specification, illustrate a preferred embodiment of the invention and together with a general description given above and the detailed description of the preferred embodiment given below, serve to explain the principles of the invention.

DETAILED DESCRIPTION OF THE PREFERRED EMBODIMENTS OF THE INVENTION

Reference will now be made in detail to the present preferred embodiments of the invention as illustrated in the accompanying drawings.

In accordance with the present invention, there is provided a multi-use carder rack adapter for bicycles, comprising: a bracket member having a first arm, a second arm, and a connecting element joining said first arm and said second arm; the first arm includes at least one aperture therein, the second arm includes at least one aperture therein, and the connecting element includes at least one aperture therein; a fastening member detachably secured to said connecting element by fastening means; a pair of adjustable clamp members, each of said pair of adjustable clamp members having a first aperture and a second aperture; said first aperture of each of said pair of adjustable clamp members is adapted to receive and secure a fastening element means allowing attachment to either the first arm or the second arm of the bracket member; a coupling member for securing a bicycle carrier rack to said bracket member, said coupling member includes a pair of legs and a joining member, each of said pair of legs are respectively adapted to be adjustably received and secured within said second aperture of one member of the pair of adjustable clamp members.

Figure 1:
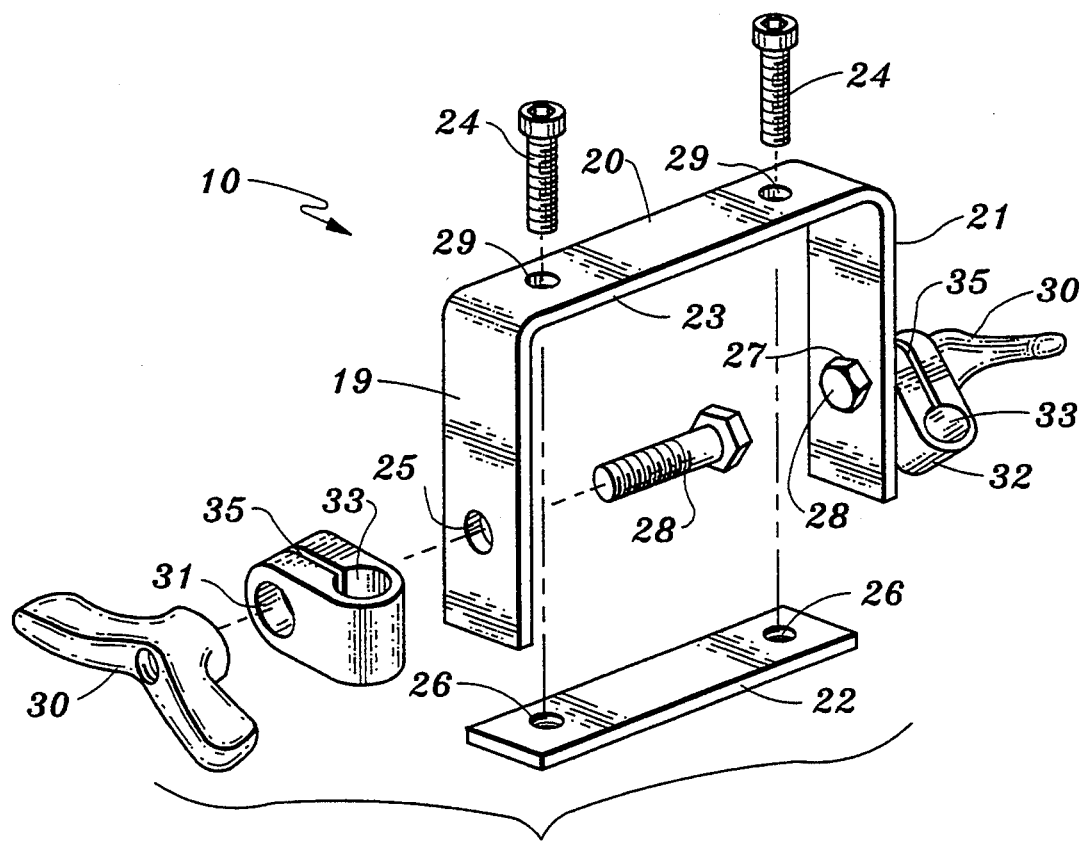
FIG. 1 shows a perspective view of a bicycle carrier rack adapter, according to the invention.

In FIG. 1 the multi-use carrier rack adapter 10 for bicycles is shown. Adapter 10 attaches to a standard bicycle rack 14 shown, for example, in FIGS. 2 and 3. Adapter 10 preferably comprises a bracket member 20 having a first arm 19, a second arm 21, and a connecting element 23 joining the first arm 19 and the second arm 21 forming a substantially C-shaped bracket. First arm 19 preferably includes at least one aperture 25 and second arm 21 preferably includes at least one aperture 27 therein, however, in alternative embodiments more apertures may be used or arm 19 and 21 made without apertures if desired. Connecting element 23 also has at least one aperture 29 therein, however, it too may be constructed with more than one aperture, or with none. Bracket member 20 is preferably composed of a flat metal bar, however, composites, thermoplastics, or any other durable resilient material may be used.

A fastening member 22 is preferably detachably secured to connecting element 23 by fastening means 24, which may be socket head cap screws 24, screws, or other mechanical fasteners well known in the art. A pair of adjustable clamp members 32, preferably compressible adjustable clamps, each of said pair of adjustable clamp member having a first aperture 31 and a second aperture 33 and a slit 35 connecting the first and second aperture. The first aperture 31 of each of said pair of adjustable clamp member 32 is adapted to receive and secure a fastening element means, which may be a screw 28 or a bolt, with hand tightened threaded knob 30, preferably a flanged wing nut or the like, allowing attachment to either the first arm 19 or the second arm 21 of bracket member 20.

A coupling member 36, preferably a rounded bar, may be composed of metal, composites, thermoplastics or the like, provides means for securing a bicycle carrier rack 12 to said bracket member 20. The metal bar 36 includes a pair of legs 38 and a joining member 39. Each of the pair of legs 38 are respectively adapted to be adjustably received and secured within said second aperture 33 of one member of the pair of adjustable clamp members 32.

The connecting element 23 of bracket member 20 is preferably drilled near each corner in line with the length of metal bar 22. Bar 22 is preferably drilled and fitted with two compression flush nuts 26, however, other mechanical fasteners may be suitably used. Screws 24 compresses and holds 22 against bracket member 20. Bracket member 20 is preferably drilled out on the opposing ends to receive a carriage, or screw 28, weld, or the like. Hand tightened knob 30 preferably a flanged wing nut secures adjustable clamp 32 on the opposing ends of bracket member 20 as shown in FIGS. 1–4. Clamp 32 is free to swivel freely when knob 30 is loosened. The position of clamp 32 is fixed against bracket member 20 when knob 30 is tightened.

Figure 2:
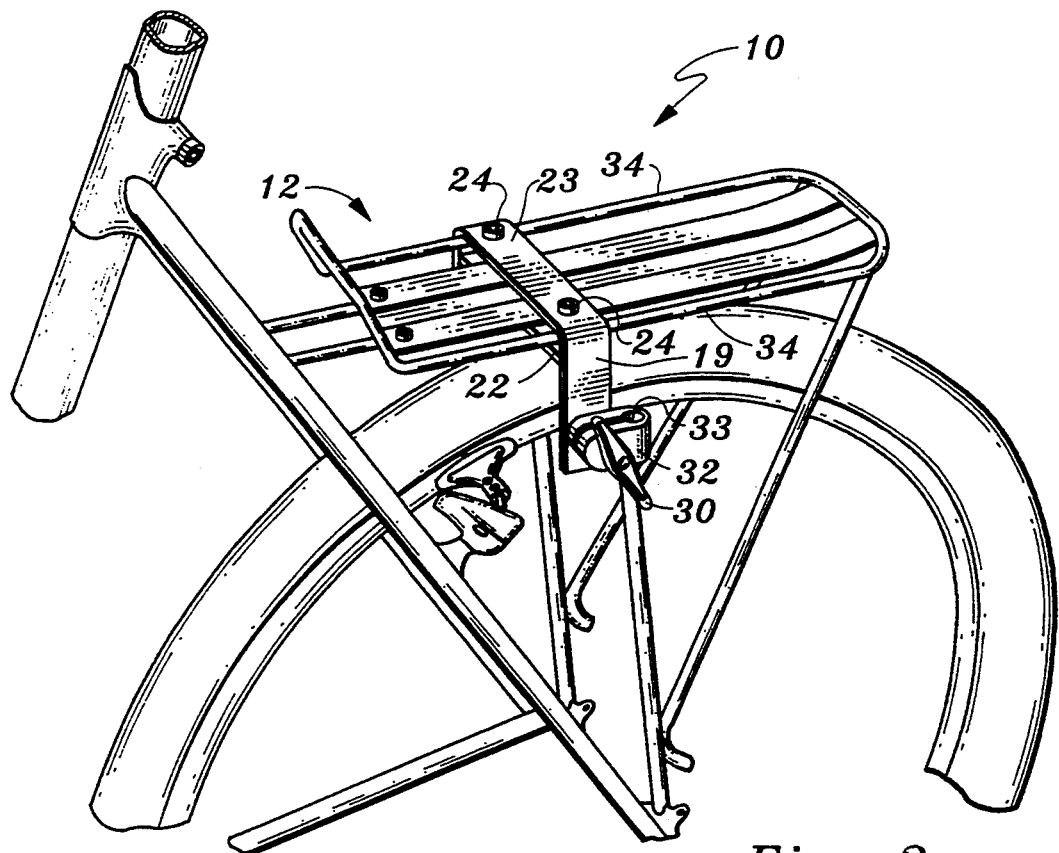
FIG. 2 shows such an adapter attached to a standard rear bicycle rack, according to the invention.
Figure 3:
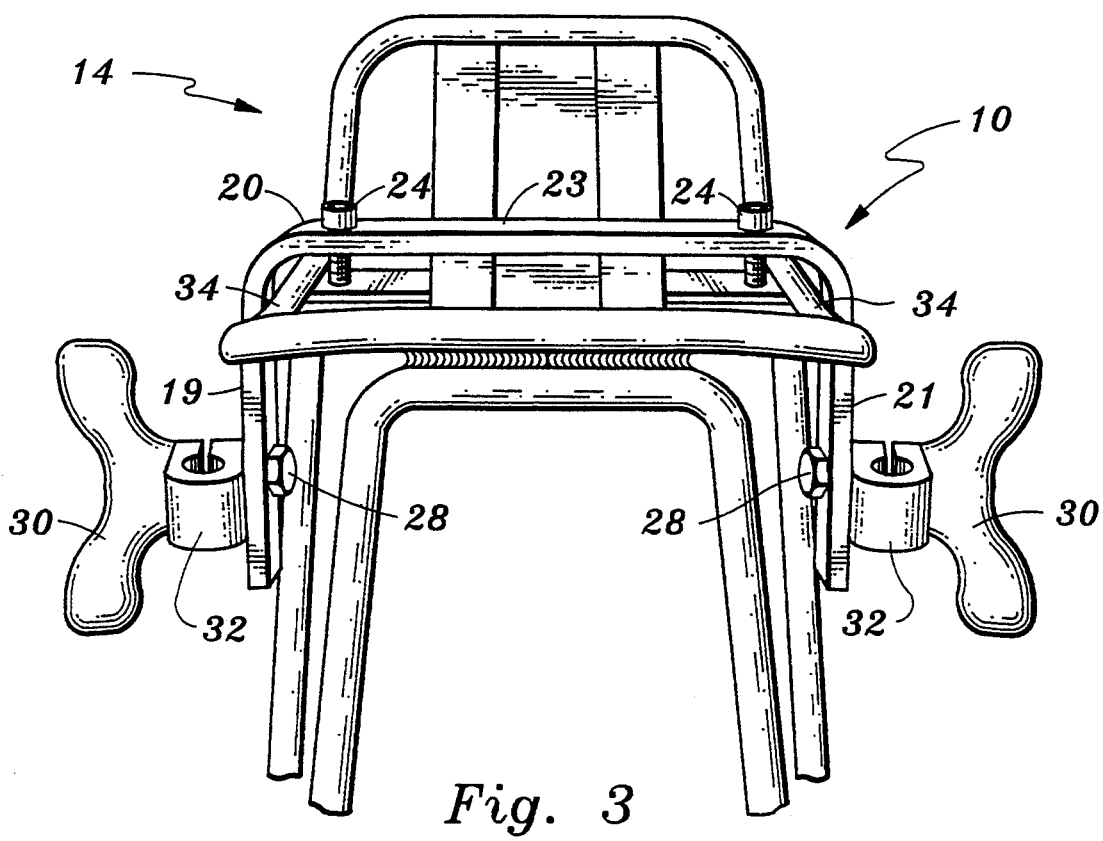
FIG. 3 is a rear view of such adapter attached to a standard rear bicycle rack, according to the invention.

In FIGS. 2 and 3, two different views of bracket member 20 are illustrated including the length of bar 22 secured under the platform side bars 34 of standard rack 14. Two screws 24, preferably socket head cap screws or the like are inserted through apertures 29 of bracket member 20, and tightening them to compression flush nuts 26 of bar 22 clamps connecting element 23 of bracket member 20 of adapter 10 to the side bars of standard rack 14.

Figure 4:
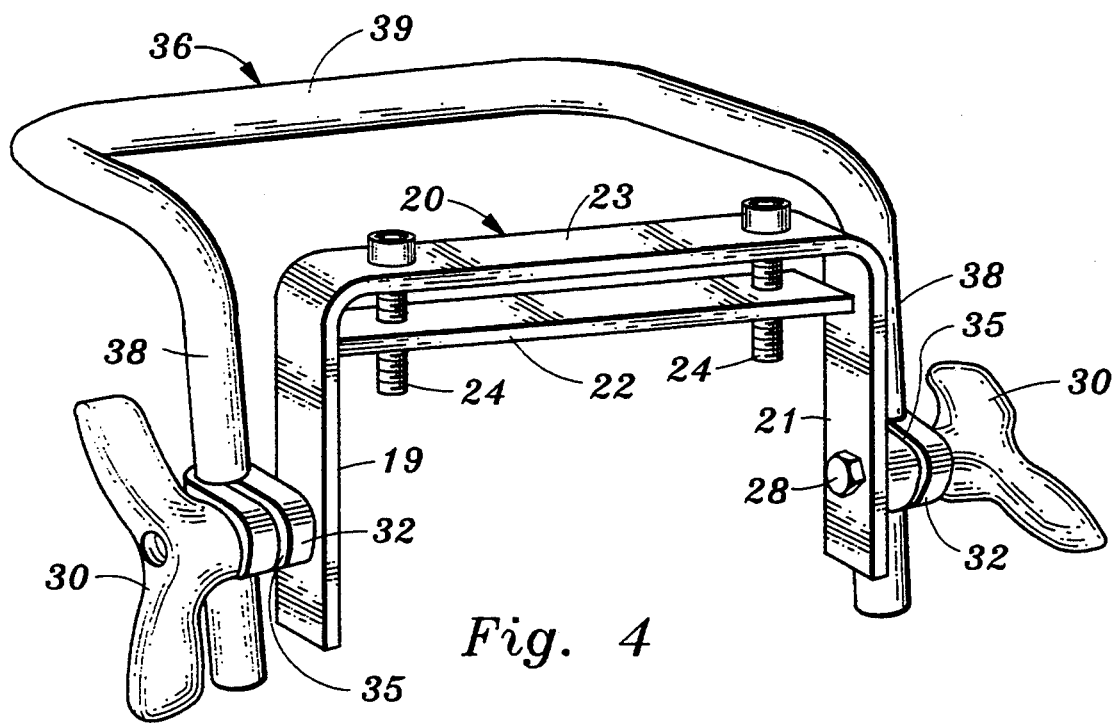
FIG. 4 is a perspective view of the coupling member attached to the adapter, according to the invention.

Referring now to FIG. 4, coupling member 36 is shown as a rounded bar which is composed of metal or other durable resilient material. Legs 38 of coupling member 36 descend and engage adjustable clamps 32 of adapter 10. Tightening flanged nut 30 of adapter 10 compresses clamp 32 against bracket member 30 which then rigidly secures coupling member 36 to the clamp and holds it in a desired position thereto.

In accordance with the present invention, a second embodiment of the invention comprises a bicycle carrier rack adapter 10, comprising: a substantially C-shaped bracket member having a first arm, a second arm, and a connecting element joining said first arm and said second arm; the first arm includes an aperture operably positioned therein, the second arm includes an aperture operably positioned therein, and the connecting element includes at least one aperture therein; a fastening member operably coupled to said connecting element by a fastening means; a pair of adjustable clamp members, each of said pair of adjustable clamp members having a first aperture, a second aperture, and a slit extending into said clamp member;, said first aperture of each of said pair of adjustable clamp members is adapted to receive and secure a fastening element means allowing attachment of said clamp member to said C-shaped bracket member;, and coupling member means for securing a bicycle carrier rack to said bracket member, said coupling member includes a pair of legs secured to a joining member; each of said pair of legs are each respectively adapted to be adjustably received and secured by one member of the pair of adjustable clamp members.

Figure 5:
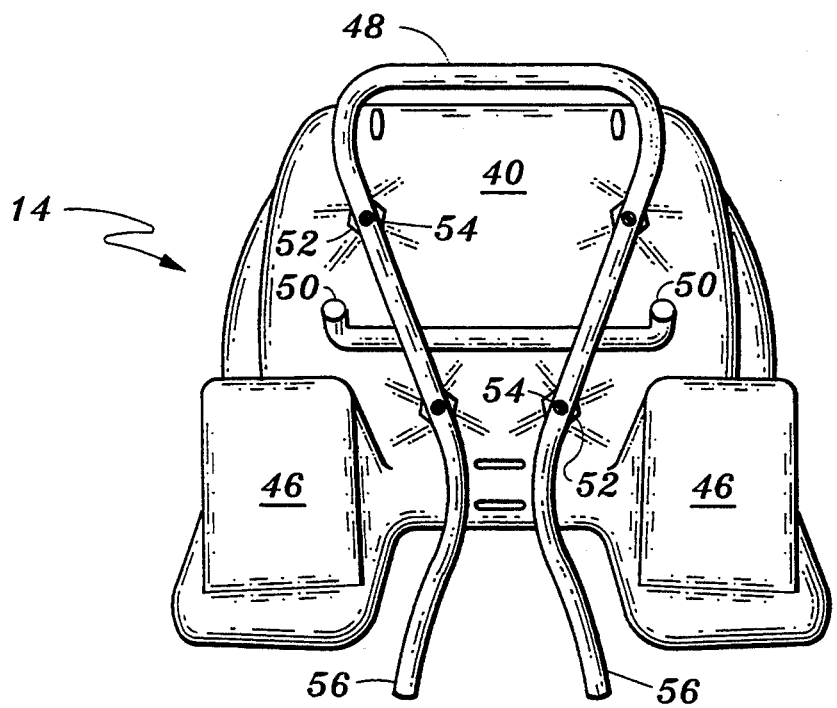
FIG. 5 is a bottom view of a modified coupling member attached to a child seat carrier according to one embodiment of the invention.
Figure 6:
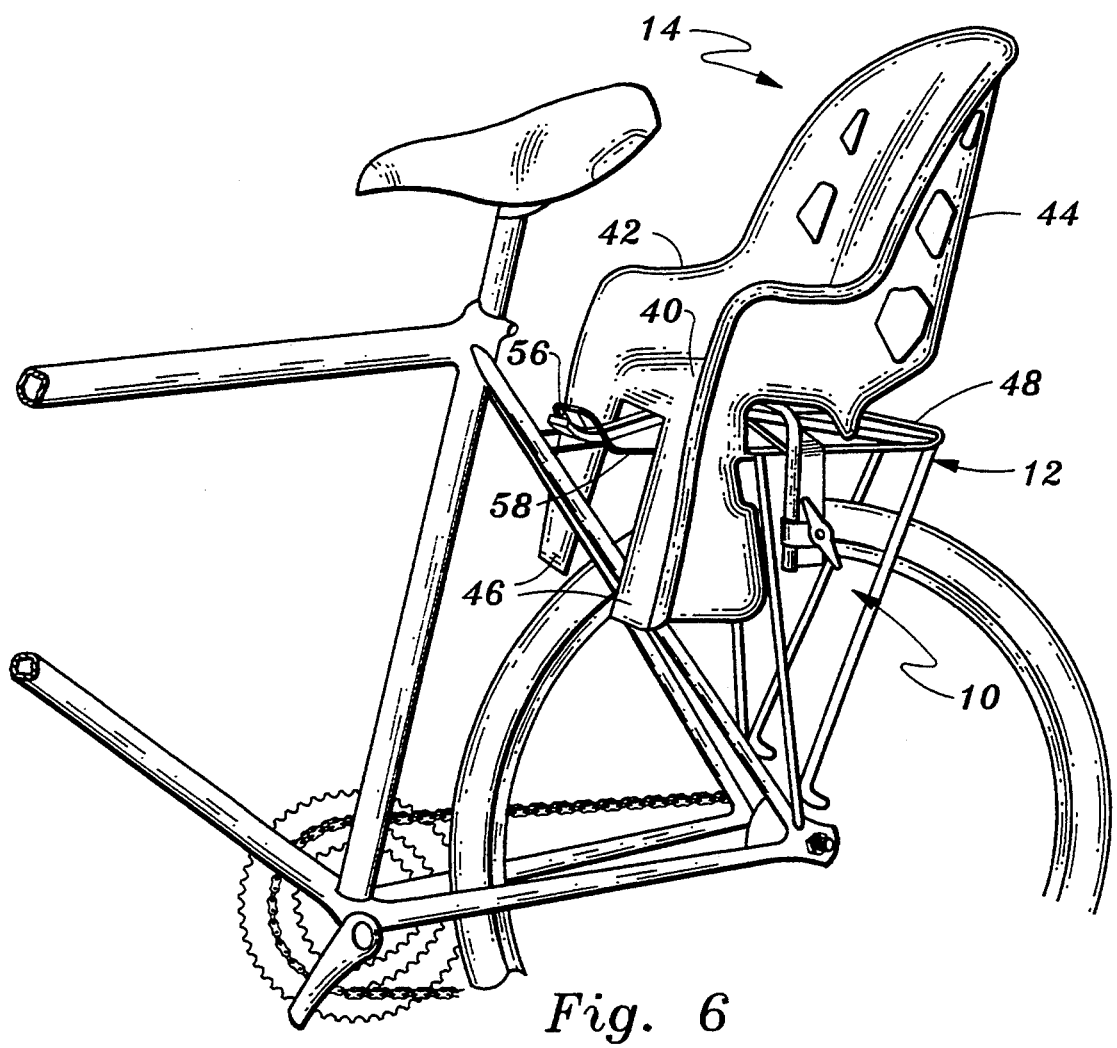
FIG. 6 is a perspective view of a child seat carrier accessory attached to a standard rear rack and the adapter, according to the invention.

As shown in FIGS. 5 and 6, a child carrier 14 includes seat 40, side arms 42, back 44, and semi-enclosed leg support portions 46 which are spaced to straddle the rear wheel of a bicycle. In this embodiment, a modified coupling member 48 with descending legs 50 is welded to coupling member 48 and configured to fit in the four integral bosses 52 of the underside of the child carrier 14. Each of the bosses 52 has been perforated and aligned with apertures in modified coupler 48 through which bolt 54 or other mechanical fastening device is passed to secure the child carrier 14 to coupling member 48. Arms 56 of modified coupling member 48 preferably ascend and flare out slightly as illustrated. In FIG. 6 child carrier 14 is shown attached to standard rack 12. Leg support portion 46 preferably straddles standard rack 12 and modified coupling member 48 rests across side bars 34. Adapter 10 is attached near the middle of standard rack 14 to accept this embodiment of adapter 10. Arms 56 of modified coupling member 48 project through the upwardly sloping terminal section 58 of the side bars of standard rack 14.

Figure 7:
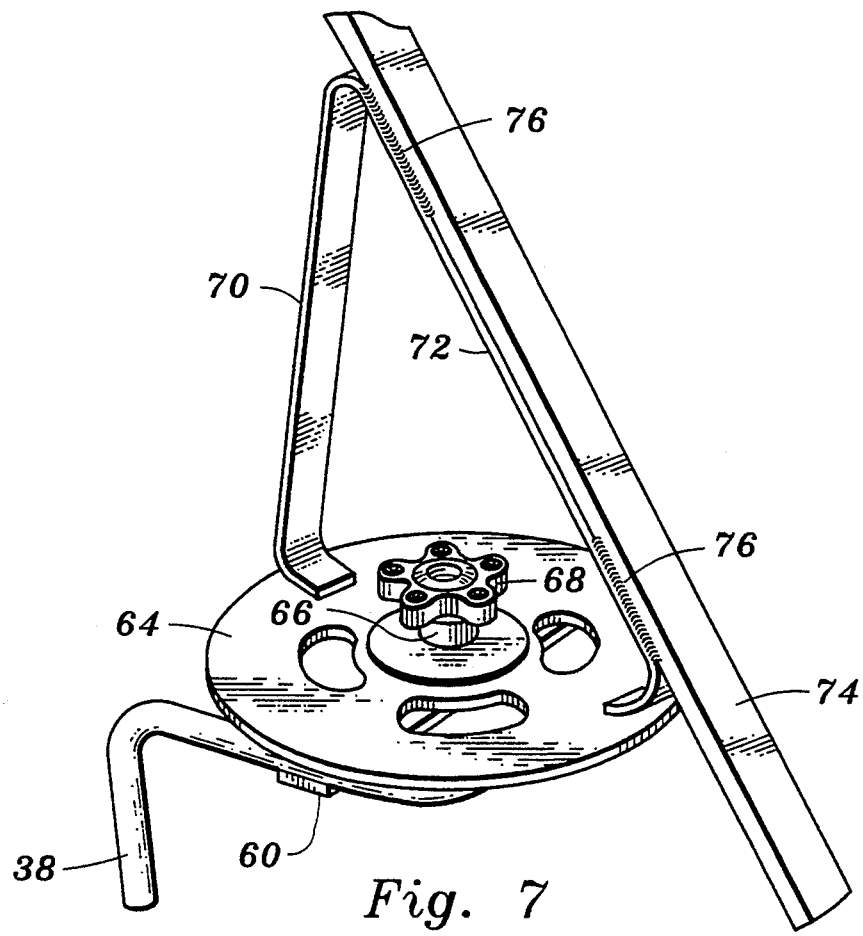
FIG. 7 shows a support and rotational means for a golf bag carrier attachment, according to one embodiment of the invention.
Figure 8:
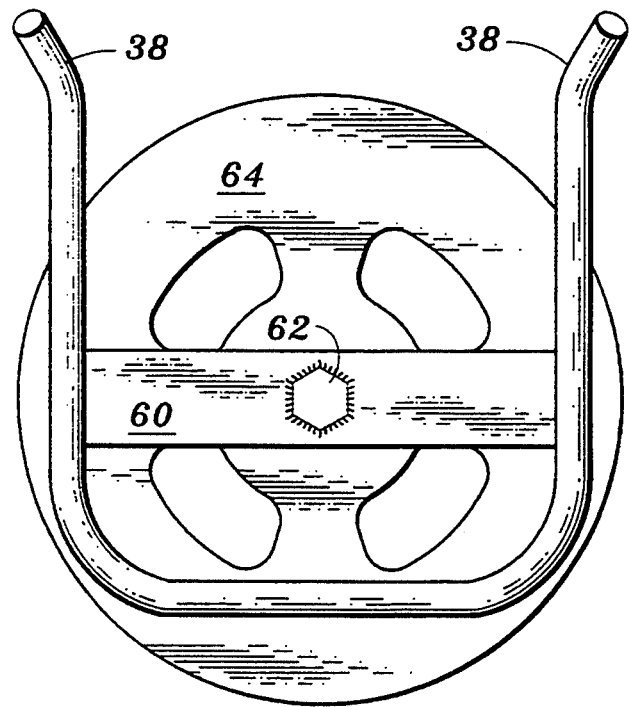
FIG. 8 is a bottom view illustrating a plate support and rotational connection for a golf bag carrier attachment to the coupling member, according to one embodiment of the invention.

Referring now to FIGS. 7 and 8, another embodiment of adapter 10 is shown for attachment to a golf bag and club accessory. In this embodiment cross bar 60 of the coupling member includes a centered aperture for a carriage or weld screw 62. A plate 64, preferably composed of metal, is made of sufficient diameter to extend the width of the coupling member is rotationally secured to the coupling member. A flange 66 and threaded knob 68 secure plate 64 to the coupling member with sufficient tension to offset torsional forces. In FIG. 7, a length of flat metal bar is shown bent in an opened acute triangular configuration 70 which is then welded or attached by other mechanical means to plate 64 as shown. The slope of the section of metal bar 72 is such that it will not intersect the rear tire of the bicycle when placed on a standard rack. Back shaft 74 of golf bag and club carrier 61 is preferably square or channel shaped for additional torsional strength. Shaft 74 is preferably welded to the triangular metal bar 70 at position 76.

Figure 9:
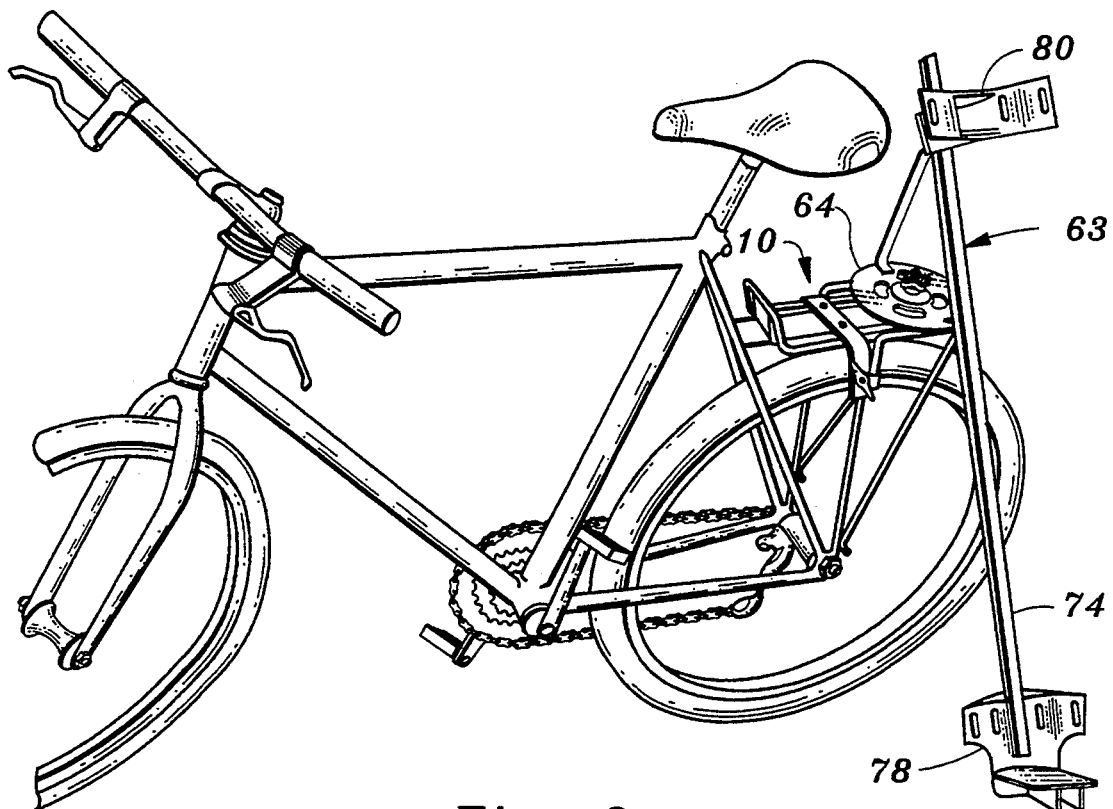
FIG. 9 shows a golf bag carrier attached to a standard rear rack with the adapter, according to one embodiment of the invention.
Figure 10:
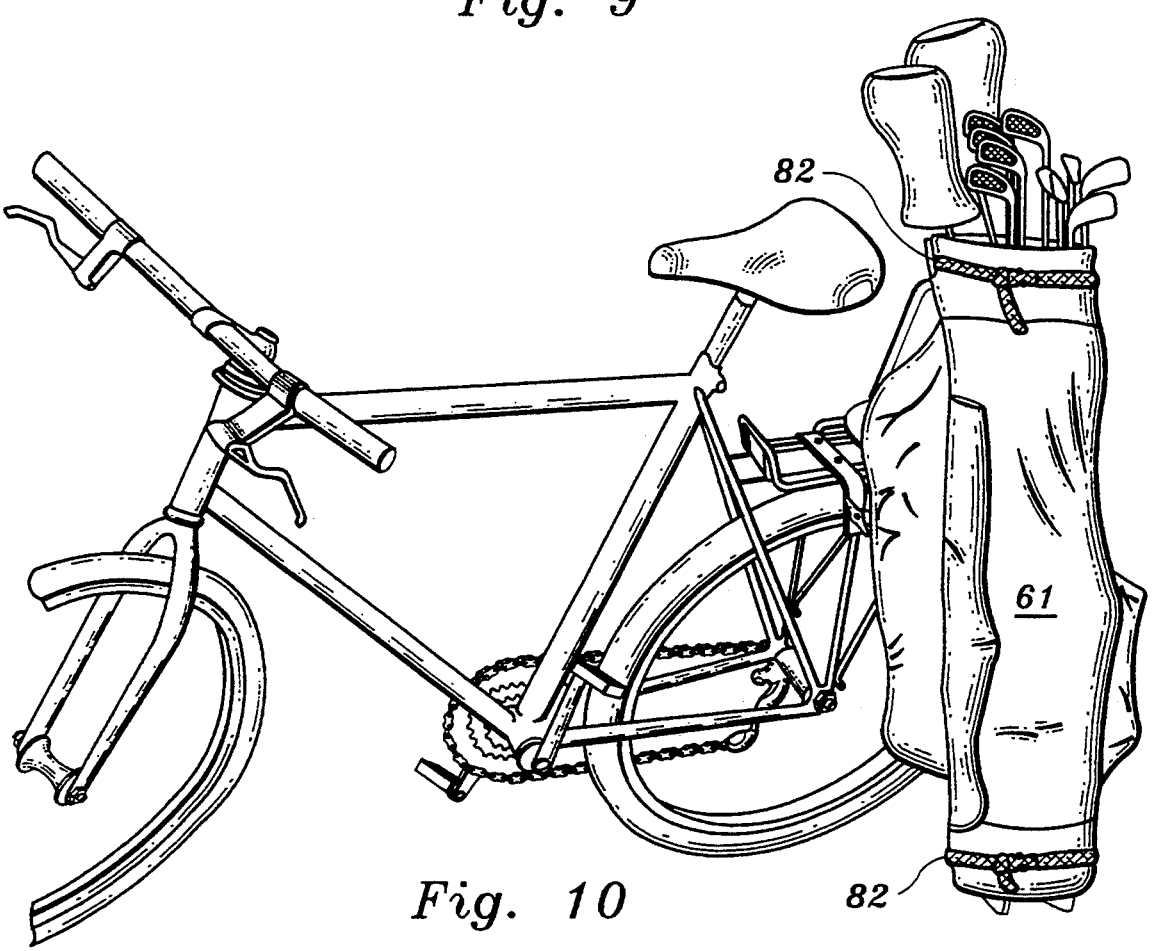
FIG. 10 is a perspective view of a golf bag attached to such carrier rack, according to one embodiment of the invention.
Figure 11:
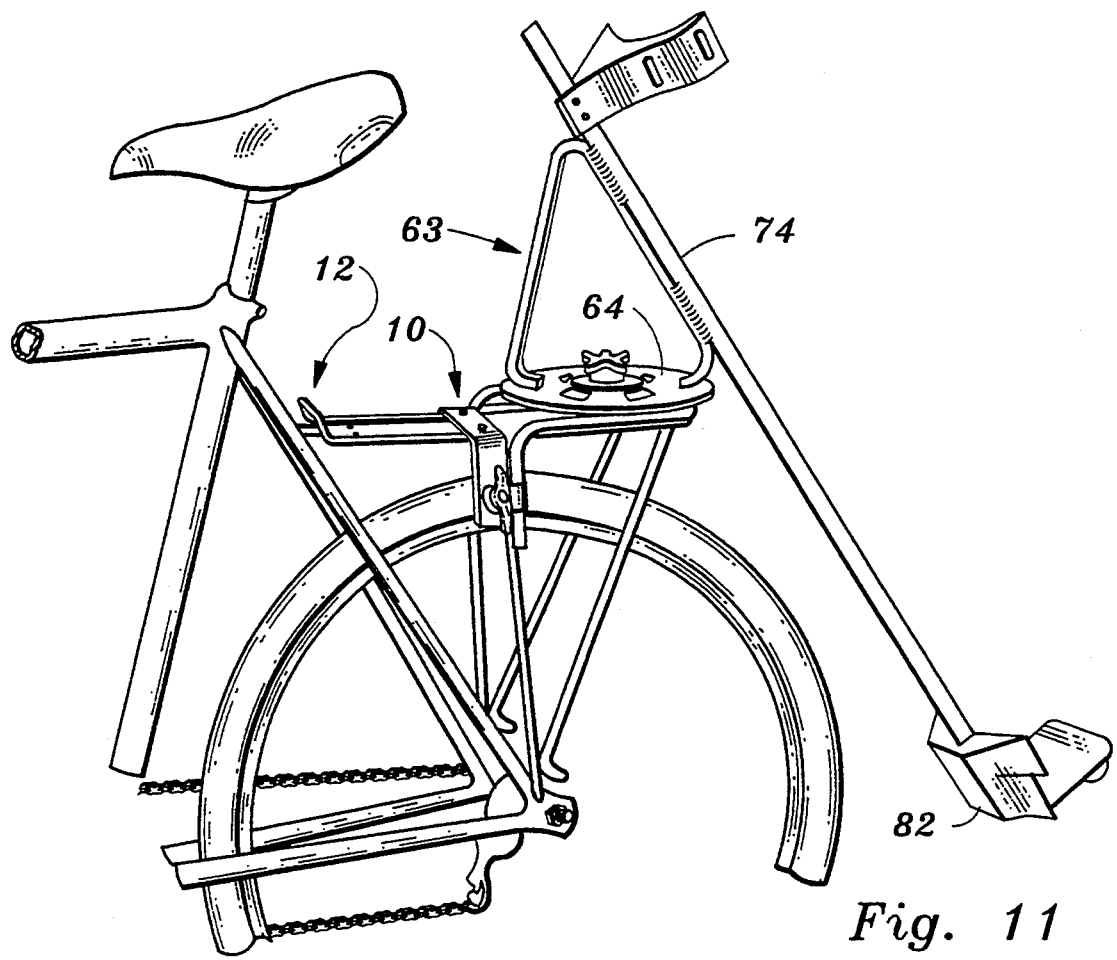
FIG. 11 shows a golf bag carrier accessory attached to a standard rear rack and adapter combination, according to the invention.

In FIGS. 9 and 10 adapter 10 is shown with golf bag and club carrier 63 attached. In FIG. 9, plate 64 is preferably rotated so that back shaft 74 is set to the side of the bicycle. Foot plate 78 and upper bracket 80 in this illustration are from Bag Boy, a division of AMF Corporation of Richmond, Va. Back shaft 74 and foot plate 78 support the bicycle in an upright position when plate 64 is rotated. In FIG. 11, golf bag and clubs 61 is attached to the carrier with cloth strap 82 securing the bag's base to the bottom foot plate 78 and the bag's neck is secured to upper bracket 80.

Figure 12:
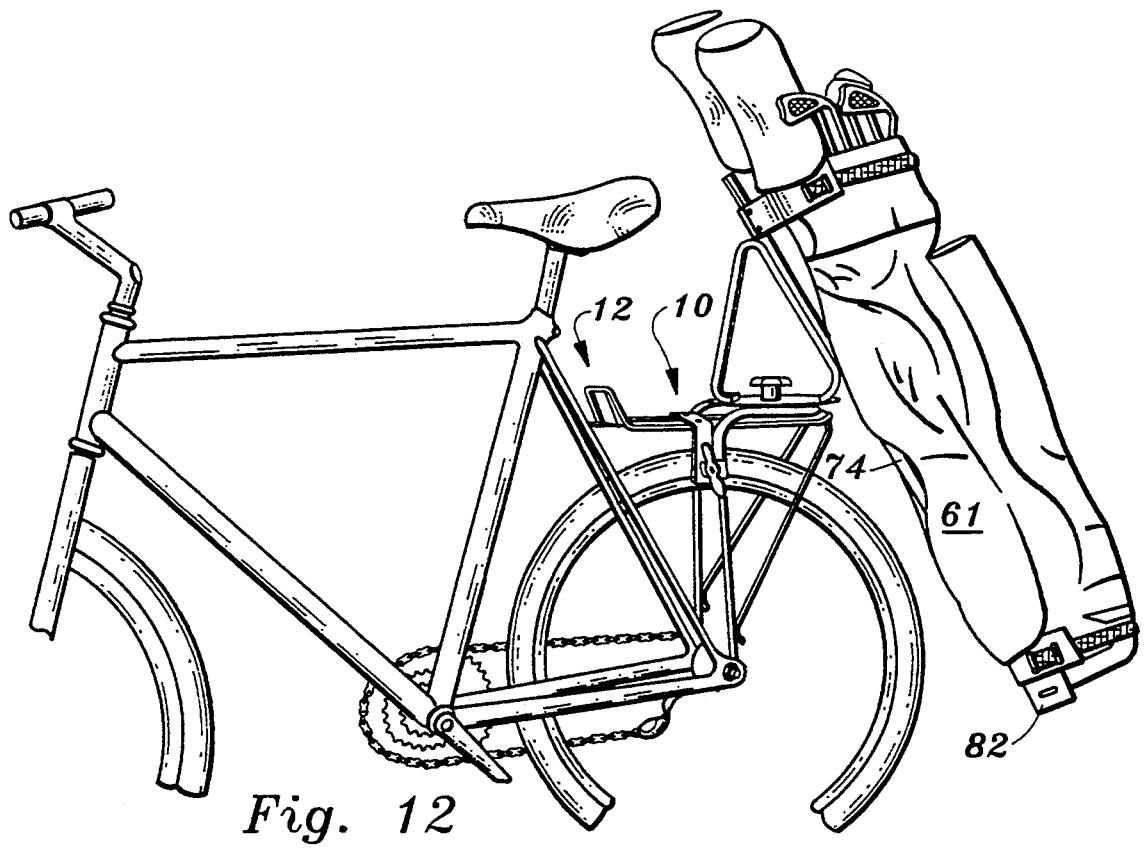
FIG. 12 is a perspective view of a golf bag attached to such adapter in the riding position, according to one embodiment of the invention.

Referring now to FIGS. 11 and 12, the position of the adapter with golf bag carrier 63 attached to standard rack 12 is illustrated with clearance provided between the slope of back shaft 74 and rear tire 82. As can be seen, adapter 10 is conveniently and safely positioned on standard rack 12 even when a large and cumbersome object, such as a golf bag and clubs are secured thereon.

Figure 13:
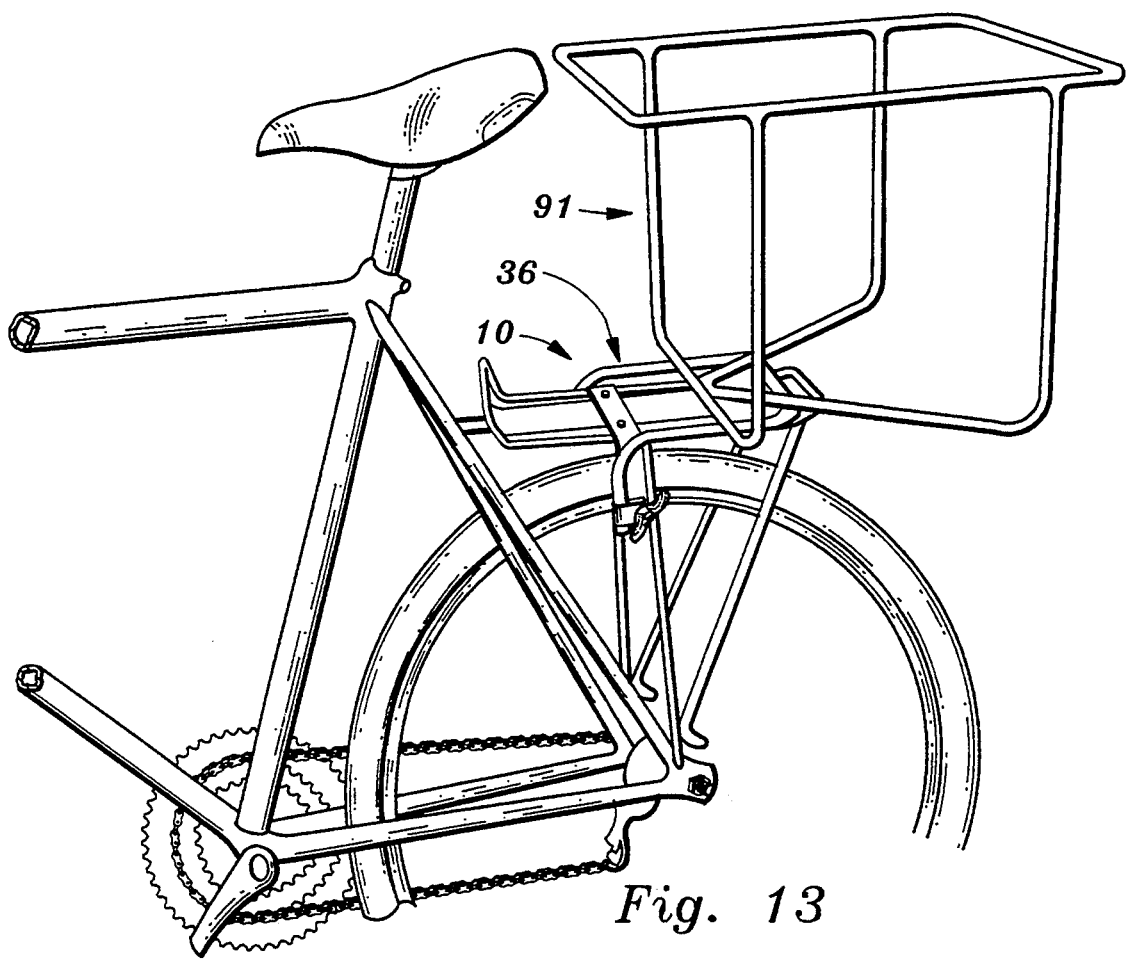
FIG. 13 shows a cargo carrier accessory attached to the adapter, according to one embodiment of the invention.
Figure 14:
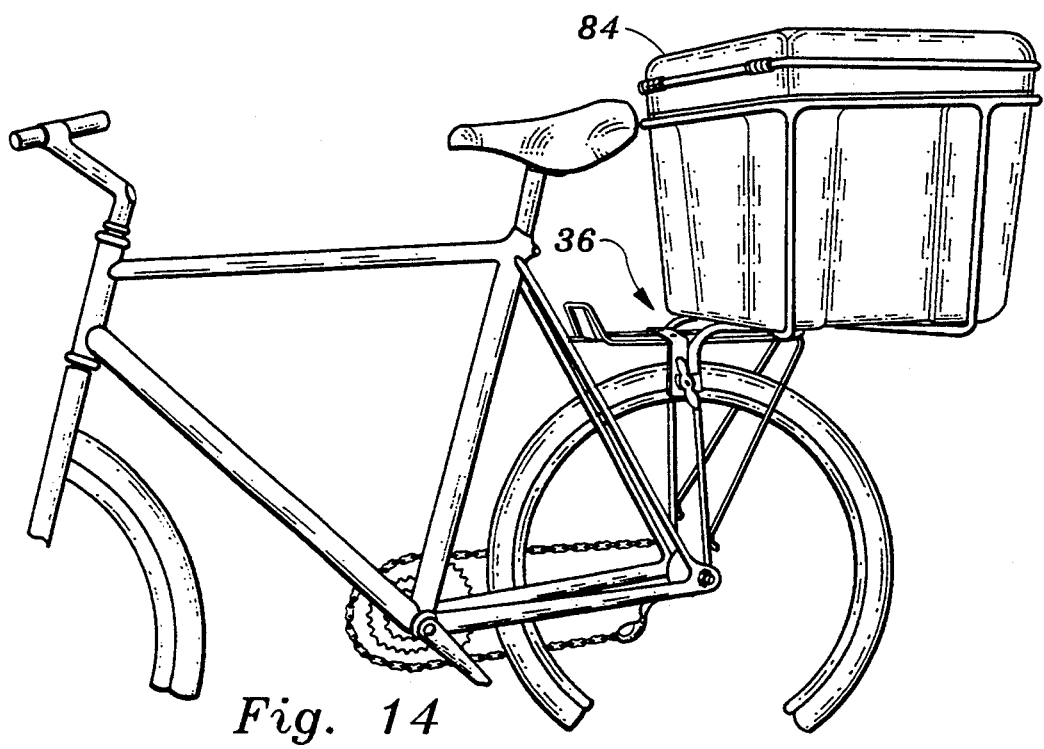
FIG. 14 show a similar view as FIG. 13 with a different cargo carrier attached, according to one embodiment of the invention.

Referring now to FIG. 13, a cargo carrier 91 is shown attached to adapter 10, according to an alternative embodiment of the invention. Such cargo carrier is another example of the wide variety of accessories which may be attached to a standard bicycle rack using the carrier rack adapter of this invention. Cargo carrier 91 is shown as three pieces of rolled metal bar which may be mechanically fastened or welded to coupling member 36. As seen in FIG. 14, the cargo carrier 91 is, in this configuration, adapted to secured and receive a transport box such as a Keepers Totelocker Jr. 84, marketed by Rubbermaid Incorporated of Wooster, Ohio, making a very convenient combination for transporting groceries, picnics, or the like.

Figure 15:
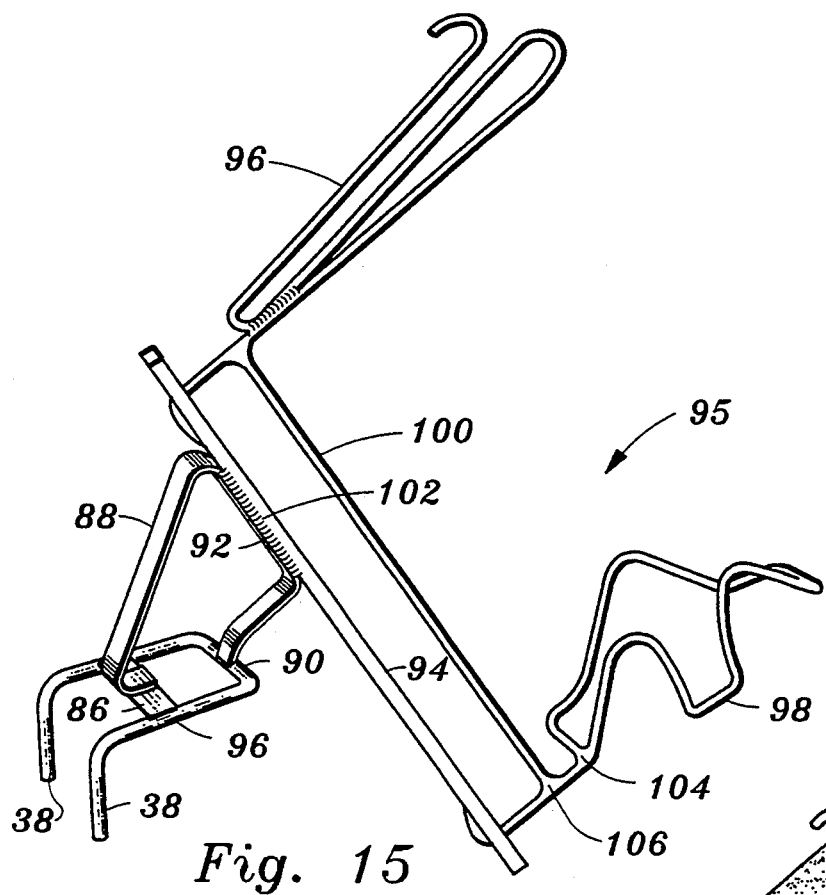
FIG. 15 shows a detail of a surfboard carrier accessory attached to the coupling member, according to one embodiment of the invention.
Figure 16:
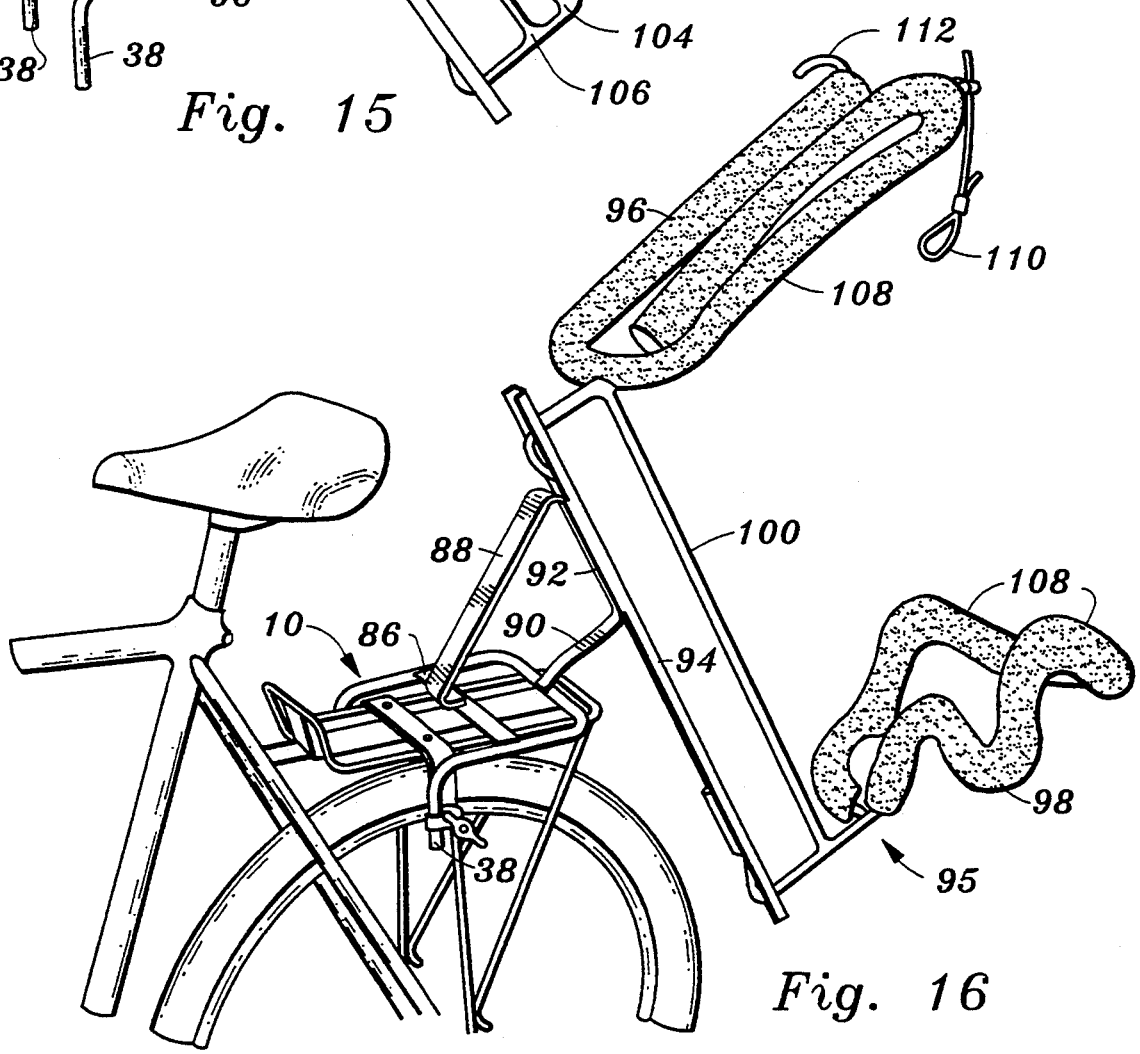
FIG. 16 shows a surfboard carrier accessory attached to a standard rear rack with the adapter, according to one embodiment of the invention.
Figure 17:
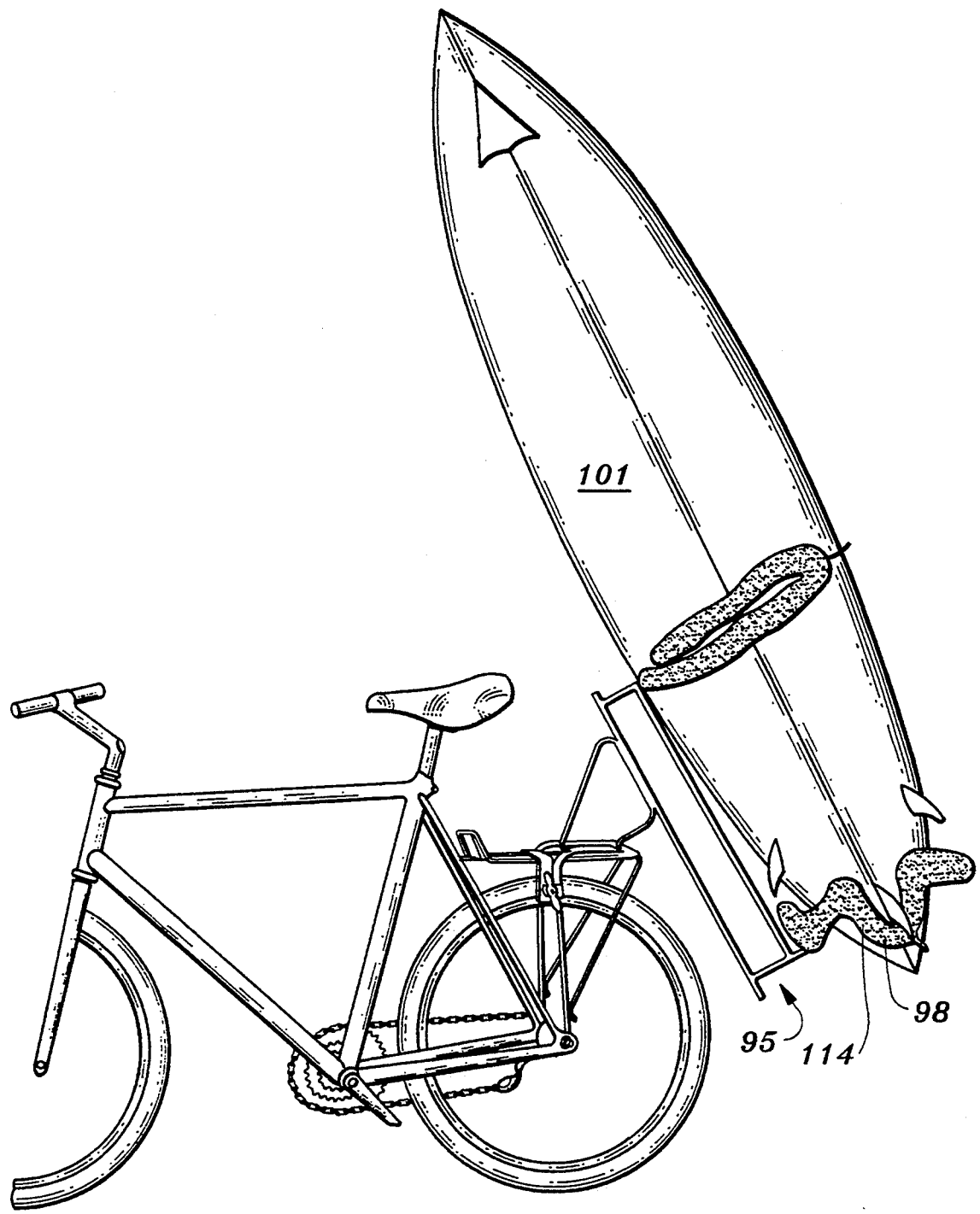
FIG. 17 shows a side view of a surfboard attached to the surfboard carrier accessory and adapter, according to the invention.

In FIGS. 15, 16, and 17, the adapter 10 is shown in operable combination with a surfboard carrier bracket 95 having a top bracket 96 and a bottom bracket 98. An alternative embodiment of the coupling member is shown as coupling member 90 with cross bar 86 welded thereto. A length of flat metal bar forming a support element 88 is bent and welded at one end to cross bar 86 and the other end is welded to the mid-portion of coupling member 90 which is positioned over the side bars of standard rack 12. Slope 92 of bar 92 extends sufficiently above the rear tire of the bicycle. Back shaft 94 is preferably channel shaped and welded to a side of metal bar 92. Top bracket 96 is bent and formed, preferably from a piece of rolled metal bar. Top bracket 96 is configured so a surfboard can be secured therein. One end of top bracket 96 extends through an aperture in back shaft 94 and is welded at site 102 as shown. A bottom bracket 98, also preferably formed form a continuous piece of rolled metal bar is shaped so either a single, double, or tri-fin surfboard can be secured therein. A free end of bottom bracket 98 is preferably welded at site 104 as shown. The other end of bottom bracket 98 is welded with the channel at position 106. A bracket element 100, preferably formed from a length of rolled metal bar is welded to the top 96 and bottom 98 bracket to reduce sway.

FIG. 16 shows top bracket 96 and bottom bracket 98 covered with foam insulation padding 108. Elastic cord 110 is shown having one end tied to top bracket 96 and the other end tied in a loop. Elastic cord 110 secures the surfboard within top bracket 96 when the loop is place over hook 112. FIG. 17 shows a tri-fin surfboard attached to carrier accessory 95. The fin sets in well 114 of bottom bracket 98 for safe, efficient, and convenient transport.

In operation and use the bicycle carrier rack adapter 10 of this invention provides a very reliable, efficient, and multi-purpose means of easily attaching various bicycle accessory carriers to a standard bicycle rack 12. Adapter 10 is attached to the standard rack 12 by simply resting bracket member 20 over the side bars 34 of standard rack 12 and placing screws 24 directly in line with bracket member 20 under side bars 34. Screws 24 are inserted through the aperture 29 on bracket member 20 and tightened to flush with nuts 26. Tightening screws 24 compresses side bars 34 between bracket member 20 and metal bar 24. Adapter 10 is then attached to standard rack 12.

Before any accessory is attached, threaded knobs 30 are loosened and legs 38 of coupling member 36 are inserted into adjustable clamp members 32. Clamp members 32 will swivel allowing the user to easily clamp one of legs 38 of coupling member 36 to adapter 10. Adjustments in positioning may be made by loosening and sliding adapter 10 either for or aft so that the coupling member 36 rests upon the end of rack 12. Each accessory, whether child carrier,cargo carrier, golf bag carrier, surfboard carrier, or the like may be attached or welded to coupling 36. When coupling member 36 is positioned, knobs 30 are tightened and the accessory attached.

Adapter 10 makes it very easy and convenient to, for example, transport golf clubs to a golf course via bicycle, or provide an unconventional means of getting around the golf course using the cart paths. Flange 66 and threaded knobs 68 hold plate 64 securely to the coupling member and slight untightening of the hand knob 68 reduces pressure of the plate against the coupler allowing plate 64 to rotate. Retightening hand knob 68 increases the pressure of plate 64 against the coupling member which immobilizes the plate. The golf bag and clubs 63 are preferably attached while plate 64 is immobilized. When hand knob 68 is loosened plate 64 may be rotated to the ride position and then knob 68 is re-tightened.

Adapter 10 may be quickly and easily attached to and removed form a bicycle, motorcycle, scooter, or the like and may be used with a wide variety of carrier accessories. It is very convenient to use for transporting a child, golf clubs, surfboard, groceries, or the like and provides an ecologically and healthy alternative to automobile transport.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

What is claimed is:

1. A multi-use bicycle carrier rack adapter, comprising:

a bracket member having a first arm, a second arm, and a connecting element joining said first and said second arm; the first arm includes at least one aperture therein, the second arm includes at least one aperture therein, and the connecting element includes at least one aperture therein;

means for securing a fastening member to said connecting element;

a pair of adjustable clamp members, each of said pair of adjustable clamp members having a first aperture and a second aperture; said first aperture of each of said pair of adjustable clamp members is adapted to receive and secure a fastening element allowing attachment to either the first arm or the second arm of the bracket member;

a coupling member for securing a bicycle carrier rack to said bracket member, said coupling member including a pair of legs and a joining member; each of said pair of legs are respectively adapted to be adjustably received and secure within said second aperture of one member of the pair of adjustable clamp members.

2. The multi-use bicycle rack adapter of claim 1 wherein said means for securing said fastening member comprises screws.

3. The multi-use bicycle carrier rack adapter of claim 1 wherein said fastening member comprises a flat bar.

4. The multi-use bicycle carrier rack adapter of claim 1 wherein said fastening element comprises a threaded knob and a screw.

5. The multi-use bicycle carrier rack adapter of claim 1 wherein said fastening element comprises a flanged nut and screw.

6. The multi-use bicycle carrier rack adapter of claim 1 wherein said pair of clamp members comprise compressible adjustable clamps.

7. The multi-use bicycle carrier rack adapter of claim 1 wherein said coupling member comprises a rounded metal bar.

8. The multi-use bicycle carrier rack adapter of claim 1 wherein said pair of legs of said coupling member are configured to ascend from and to flare outward from said joining member allowing attachment of a child carrier rack thereto.

9. The multi-use bicycle carrier rack adapter of claim 1 wherein said coupling member further includes a cross bar having a centrally positioned aperture for holding a threaded fastener therein for securing a metal plate on the coupling member; said plate having a flange member and a triangulated element secured thereto allowing attachment of a golf bag.

10. The multi-use bicycle carrier rack adapter of claim 1 wherein said coupling member further includes a cross bar secured to a support element, said support element is fastened to a bracket element having a top and a bottom bracket secured thereto allowing attachment of a surfboard thereto.

11. A bicycle carrier rack adapter, comprising:
a substantially C-shaped bracket member having a first arm, a second arm, and a connecting element joining said first arm and said second arm; the first arm includes an aperture operably positioned therein, the second arm includes an aperture operably positioned therein, and the connecting element includes at least one aperture therein;
means for securing a fastening member to said connecting element;
a pair of adjustable clamp members, each of said pair of adjustable clamp members having a first aperture, a second aperture, and a slit extending into said clamp member; said first aperture of each of said pair of adjustable clamp members is adapted to receive and secure a fastening element allowing attachment of said clamp member to said C-shaped bracket member;
a coupling member for securing a bicycle carrier rack to said bracket member, said coupling member includes a pair of legs secured to a joining member, each of said pair of legs are each respectively adapted to be adjustably received and secured by one of the pair of adjustable clamp members.

12. The bicycle carrier rack adapter of claim 11 wherein said means for securing said fastening member to said connecting element comprises screws.

13. The bicycle carrier rack adapter of claim 11 wherein said fastening member comprises a flat bar.

14. The bicycle carrier rack adapter of claim 11 wherein said fastening element comprises a threaded knob and a screw.

15. The bicycle carrier rack adapter of claim 11 wherein said fastening element comprises a flanged nut and a screw.

16. The bicycle carrier rack adapter of claim 11 wherein said pair of adjustable clamp members comprise compressible adjustable clamps.

17. The bicycle carrier rack adapter of claim 11 wherein said coupling member comprises a rounded metal bar.

18. The bicycle carrier rack adapter of claim 11 wherein said pair of legs of said coupling member are configured to ascend from and to flare outward from said joining member allowing attachment of a child carrier thereto.

19. The bicycle carrier rack adapter of claim 11 wherein said coupling member further includes a cross bar having a centrally positioned aperture for holding a threaded fastener therein for securing a metal plate on the coupling member; said plate having a flange member and a triangulated element secured thereto allowing attachment of a golf bag.

20. The bicycle carrier rack adapter of claim 11 wherein said coupling member further includes a cross bar secured to a support element, said support element is fastened to a bracket element having a top and a bottom bracket secured thereto allowing attachment of a surfboard therein.

* * * * *